United States Statutory Invention Registration [19]

[11] Reg. Number: H936

Ho et al. [43] Published: Jul. 2, 1991

[54] THERMONUCLEAR INVERSE MAGNETIC PUMPING POWER CYCLE FOR STELLARATOR REACTOR

[75] Inventors: Darwin D. Ho, Pleasanton, Calif.; Russell M. Kulsrud, Princeton, N.J.

[73] Assignee: The United States of America as represented by the United States Department of Energy, Washington, D.C.

[21] Appl. No.: 911,533

[22] Filed: Sep. 25, 1986

[51] Int. Cl.[5] ..... G21B 1/00

[52] U.S. Cl. ..... 376/124; 376/143; 376/147; 376/131; 376/911

[58] Field of Search ..... 376/124, 147, 146, 911, 376/100, 143, 131

[56] References Cited

U.S. PATENT DOCUMENTS

| | | | |
|---|---|---|---|
| 2,991,238 | 7/1961 | Phillips et al. | 376/147 |
| 3,015,618 | 1/1962 | Stix | 376/124 |
| 3,026,447 | 3/1962 | Kerst | 376/147 |
| 3,170,841 | 2/1965 | Post | 376/147 |
| 3,260,869 | 7/1966 | Hall | 376/147 |
| 3,436,918 | 4/1969 | Brogan et al. | 376/911 |
| 3,702,163 | 11/1972 | Furth et al. | 376/124 |
| 4,363,775 | 12/1980 | Bussard et al. | 376/146 |
| 4,367,193 | 1/1983 | Bussard | 376/146 |
| 4,639,348 | 1/1987 | Jarnagin | 376/128 |

OTHER PUBLICATIONS

UWFDM-129, 10/75, "Tokamak-20", vol. II, part 2, pp. 1-4.

Controlled Thermonuclear Reactions, 1975, Glassfore et al., pp. 290-292, 295, 297, 298, 300, 301, 320-322.

*Fusion Energy Update*, by G. H. Miley, published by the ANS, 1976, pp. 152-213.

*Primary Examiner*—Harvey E. Behrend

*Attorney, Agent, or Firm*—Gustavo Siller; Paul A. Gottlieb; Judson R. Hightower

[57] ABSTRACT

The plasma column in a stellarator is compressed and expanded alternatively in minor radius. First a plasma in thermal balance is compressed adiabatically. The volume of the compressed plasma is maintained until the plasma reaches a new thermal equilibrium. The plasma is then expanded to its original volume. As a result of the way a stellarator works, the plasma pressure during compression is less than the corresponding pressure during expansion. Therefore, negative work is done on the plasma over a complete cycle. This work manifests itself as a back-voltage in the toroidal field coils. Direct electrical energy is obtained from this voltage. Alternatively, after the compression step, the plasma can be expanded at constant pressure.

The cycle can be made self-sustaining by operating a system of two stellarator reactors in tandem. Part of the energy derived from the expansion phase of a first stellarator reactor is used to compress the plasma in a second stellarator reactor.

19 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMONUCLEAR INVERSE MAGNETIC PUMPING POWER CYCLE FOR STELLARATOR REACTOR

CONTRACTUAL ORIGIN OF THE INVENTION

The U.S. Government has rights in this invention pursuant to Contract No. DE-AC02-76CH03073 between the U.S. Department of Energy and Princeton University.

BACKGROUND OF THE INVENTION

The present invention relates generally to a method for generating electricity from a fusion reactor and more particularly to a method for direct conversion of alpha-particle energy into electricity in a stellarator reactor.

The guest to tap the energy of nuclear fusion by employing magnetic fields to confine an ultrahot plasma and generating electric power has been in progress for more than three decades.

Several toroidal magnetic confinement fusion devices have been proposed. One such device is the tokamak where a toroidal current induced inside the plasma both heats the plasma and provides the poloidal magnetic field. There are several drawbacks, however, associated with the tokamak. The large plasma current needed for confinement in a tokamak, carries a large free energy that can be tapped by instabilities which destroy the confinement. Another problem associated with the plasma current is that it must be maintained by some means other than a transformer, since otherwise the pulse length is limited by the number of volt-seconds in the transformer windings.

Another toroidal confinement machine is the stellarator, where the poloidal field is produced externally to the plasma by current-carrying conductors wound helically around the torus. This configuration does not require the large plasma current needed in a tokamak. Stellarators are capable of achieving betas several times greater than betas achievable in a tokamak. Stellarators are also capable of steady-state operation.

A major problem in the design of a commercial fusion stellarator reactor, as with other conventional power sources, is the conversion of the thermal energy produced into electrical energy.

Conventional designs call for the use of the thermal energy produced by fusion reactions to convert water to steam. The steam is used in a dynamic conversion processes to drive turbines and turbogenerators. This dynamic conversion process requires turbines, pumps, generators, large cooling systems and extensive piping systems. This auxiliary equipment is expensive, unreliable and relatively inefficient.

Direct energy conversion techniques for tokamaks have been suggested in *Fusion Energy Conversion,* by George H. Milley, published by the American Nuclear Society, 1976. The problems associated with tokamaks, however, have been discussed above.

Therefore, in view of the above, it is an object of the present invention to provide a novel cycle of operation for a stellarator fusion reactor.

It is another object of the present invention to provide a novel cycle of operation for a stellarator fusion reactor for directly converting fusion energy into electrical energy.

It is another object of the present invention to provide a novel cycle of operation of a stellarator fusion reactor which may be used in advanced neutron-beam fueled reactors.

Is is a further object of the present invention to provide a cycle of operating two stellarators in tandem, such that the cycle is self-sustaining.

It is still another object of the present invention to provide a stellarator reactor capable of directly generating electricity.

It is still a further object of the present invention to provide a stellarator reactor system which is self-sustaining.

Additional objects, advantages and novel features of the invention will become apparent to those skilled in the art upon examination of the following or may be learned by practice of the invention. The objects and advantages of the invention maybe realized and attained by means of the instrumentalities and combinations particularly pointed out in the appended claims.

SUMMARY OF THE INVENTION

To achieve the foregoing and other objects in accordance with the purpose of the present invention, as embodied and broadly described herein, the method of this invention may comprise a three step process in which the minor radius of a stellarator is compressed and expanded. In the first step an ignited plasma is in thermal balance. The plasma is compressed adiabatically and the plasma $\beta$ decreases. In the next step the plasma volume is kept constant and the plasma temperature and 62 are driven up by the excess thermonuclear alpha-particle heating. As $\beta$ approaches the maximum $\beta$ attainable, the rate of energy loss increases until it balances the alpha-particle heating power and the plasma is again in a state of thermal balance. In the final step the plasma is expanded back to its original radius. When the plasma expands the corresponding pressure is higher than the corresponding pressure during compression since $\beta$ stays at $\beta_c$ during the expansion. Therefore, negative work is done on the plasma over the complete cycle. This work manifests itself as a back-voltage in the toroidal field coils and direct electrical energy is obtained from this voltage.

As an alternate cycle, net work can also be done on the external system by allowing the plasma to expand at a constant pressure in the second step of the method, rather than keeping the plasma at constant volume.

A magnetic confinement fusion reactor for directly generating electricity using the methods of the present invention comprises: a vacuum vessel; helical stabilizing coils; toroidal confining coils; means for generating a current through the toroidal coils; means for compressing a plasma disposed in the vacuum vessel; means for maintaining the volume of the plasma constant; means for expanding the plasma and means for transmitting current generated by the plasma from the toroidal coils.

By operating two or more reactors in tandem, such that part of the energy produced by one reactor is used to compress and/or maintain a constant plasma volume in a second reactor the cycle can be made self-sustaining.

The present invention provides a method and apparatus for obtaining electrical energy directly from a stellerator fusion reactor. Therefore, the present invention obviates the need for any of the intervening machinery associated with a turbogenerator.

DETAILED DESCRIPTION OF THE INVENTION

Figure 1:
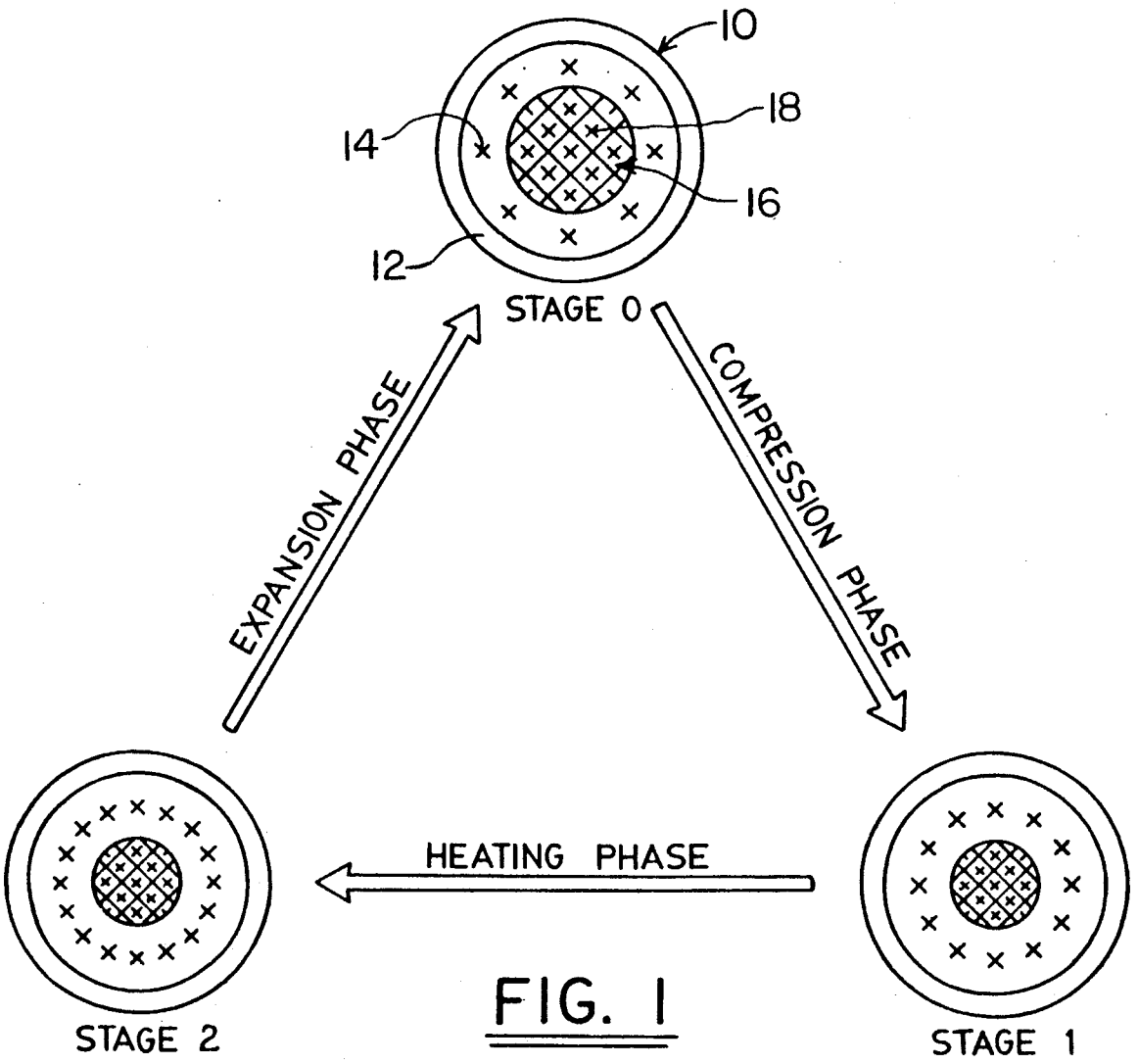
FIG. 1 is a schematic representation of a cross-section of a stellarator reactor at various stages during the thermonuclear inverse magnetic pumping power cycle.

Reference will now be made to the present preferred embodiments of the present invention, an example of which is illustrated in the accompanying drawings. FIG. 1 illustrates the power cycle of the present invention, for direct conversion of alpha-particle energy to electricity for a stellarator reactor. This power cycle provides an alternative scheme in energy conversion for deuterium-tritium (D-T) fueled reactors and could become an important method in energy conversion for advanced neutron-lean fueled (e.g. D-$He^3$) reactors. The direct energy conversion is achieved by alternately compressing and expanding the plasma minor radius of a stellarator reactor 10. The cycle may be used in a stellarator reactor as shown by reactor 10 in FIG. 9. the cycle will now be discussed with reference to a single stellarator reactor 10. (A description of a two-reactor system is described subsequently.) Reactor 10 includes external toroidal magnetic confining coils 12, helical stabilizing coils 13, and vacuum vessel 19. A generator 15 provides electrical energy to coils 12 via line 34. Control means 37 operatively associated with lines 32 and 34 engage and disengage load 17 and generator 15 from toroidal coils 12 in response to plasma parameters. The cycle is composed of three stages.

In a preferred embodiment of the present invention, ignited plasma 16 is thermally stable and in thermal balance at stage 0. (Conditions for an ignited plasma may be found in the published literature. For example, reference is made to *Controlled Thermonuclear Reactions* by Samuel Glasstone and Ralph Lovberg published by D. Van Nostrand Co., Inc., Princeton, N.J., 1960.) The plasma $\beta$ is slightly above $\beta_c$. [$\beta=(P/B_i^2/8\pi)$, i.e. the ratio of plasma kinetic to the internal magnetic field pressure, and $\beta_c$, the maximum attainable $\beta$, is set by the onset condition for MHD ballooning instabilities.] During the compression phase (from stage 0 to stage 1), plasma 16 is compressed adiabatically by increasing the external toroidal compressed magnetic field strength 14 generated by toroidal coils 12 and the plasma $\beta$ decreases. At stage 1, the end of the compression phase, $\beta$ is less that $\beta_c$ and the plasma 16 is no longer in thermal balance since the thermonuclear alpha-particle heating power exceeds the rate of energy loss (due to neoclassical transport, turbulent convection, and Bremsstrahlung radiation). During the heating phase (from stage 1 to stage 2), as the plasma temperature is driven up by the excess heating power, the plasma volume is kept constant by further increasing the external field strength 14. As $\beta$ approaches $\beta_c$, the rate of energy loss increases until it balances the alpha-particle heating power when $\beta$ reaches $\beta_c$. The plasma 16 is again in thermal balance and is thermally stable. This is stage 2 of the cycle.

To complete the cycle, the external field 14 is then reduced so that the plasma 16 expands back to its original radius during the expansion phase (from stage 2 to stage 0). When the plasma 16 expands, the plasma $\beta$ tends to increase. However, $\beta$ is already at $\beta_c$ at stage 2, hence ballooning instabilities force $\beta$ to stay at $\beta_c$ through turbulent convection during the entire expansion phase. As a result, the plasma pressure during the expansion is higher than the corresponding pressure during the compression. Therefore, negative work is done on the plasma 16 during a complete. cycle. Note that if there is no $\beta$ limit, then more work can be obtained during a complete cycle. This work manifests itself as a back-voltage in the toroidal field coils 12 and direct electrical energy is obtained from this voltage. By operating two or more reactors in tandem, the cycle can be made self-sustaining.

As an alternative cycle, net work is done on the external system by letting the plasma expand at constant pressure between stages 1 and 2, rather than keeping the plasma at constant volume. These two methods (heating phase at constant plasma volume and at constant plasma pressure) are discussed below as the preferred embodiments of the present invention. As will be recognized by those skilled in the art, there are many other possible methods, that can also result in net work done, e.g. the plasma minor radius varies sinusoidally during the cycle.

If the external magnetic field 14 is considered to be a "piston," then the external system absorbs work done by the pumping action of the plasma 16 on the piston. This action will be referred to as "magnetic pumping". It is "inverse magnetic pumping" over a full cycle because work is done on the external system by the plasma 16. Note that this concept of magnetic pumping differs from the traditional definition which refers to "gyro-relaxation,".

The detailed physical processes at, and between, various stages of the cycle are analyzed below. To simplify the analysis, the plasma column is modeled by a straight cylinder. The plasma density, temperature, and the magnetic field 18 are assumed to be uniform across the minor radius except for a sharp discontinuity across the boundary between the plasma 16 and the confining vacuum magnetic field 14. Throughout this analysis, the plasma is assumed to behave like an ideal MHD fluid.

Due to the nonlinear temperature dependence of the alpha-particle heating power term and the power loss terms, the thermonuclear plasma in a stellarator can have more than one thermal equilibrium, i.e., the thermonuclear power can balance the power losses at different temperatures, or have no equilibrium at all. A qualitative discussion about the possible thermal equilibria and their stability is given here. The reactor parameters listed in Table I are used in the discussion here.

TABLE I.

| STELLARATOR REACTOR PARAMETERS | |
|---|---|
| Plasma density ($cm^{-3}$) | $6 \times 10^{14}$ |
| Plasma temperature (keV) | 10 |
| Toroidal magnetic field (KG) | 50 |
| Plasma $\beta$ (%) | 19.3 |
| Major Radius (m) | 10 |
| Minor Radius (m) | 2 |
| $\epsilon h$ | 0.1 |

Figure 2:
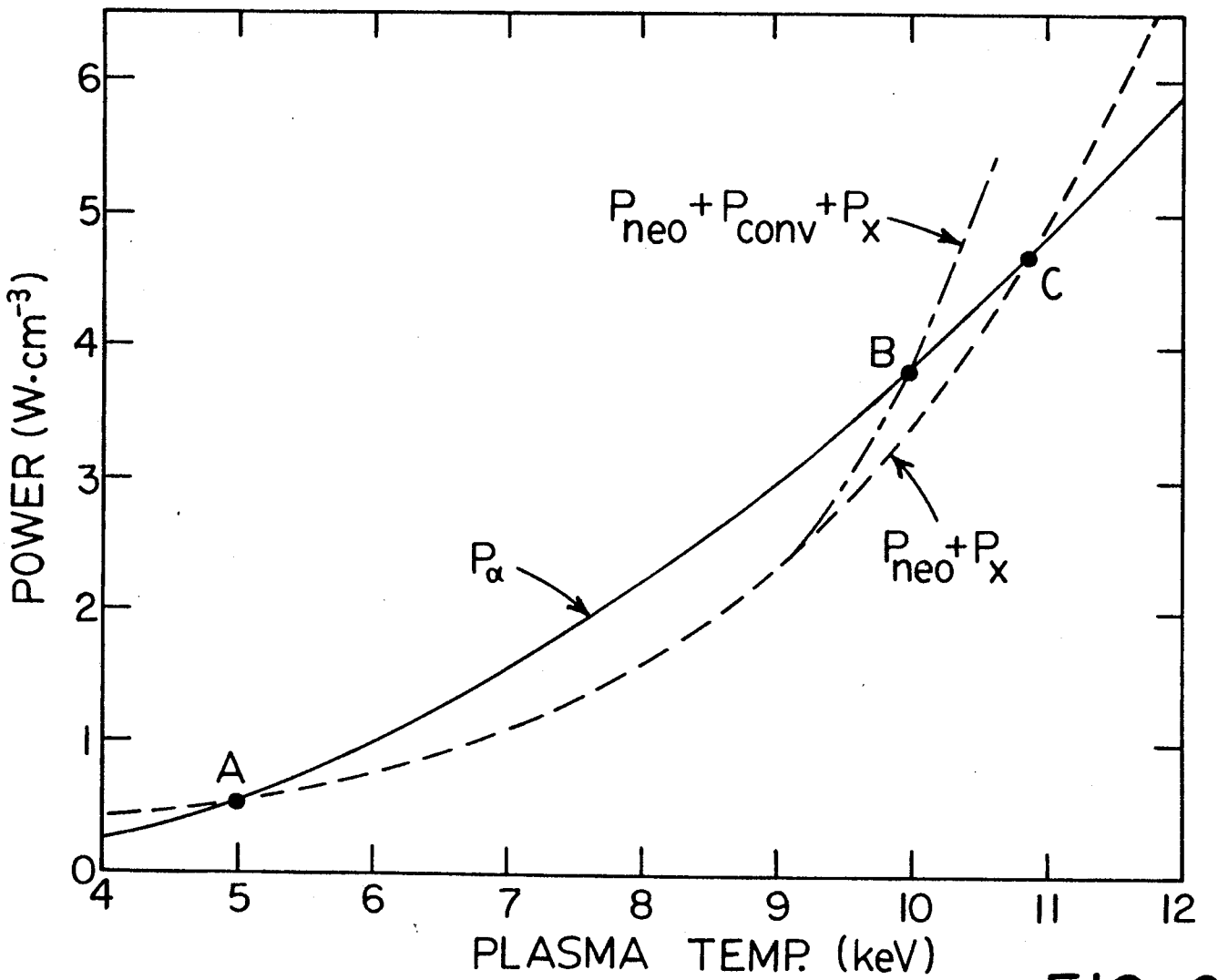
FIG. 2 is a graph showing a comparison of heating power with power losses for the plasma in the stellarator with machine parameters as given in Table I.

For a fixed plasma density ($n=6\times10^{14}$ $cm^{-3}$), the thermonuclear alpha-particle heating power per unit volume is plotted versus plasma temperature as the solid curve in FIG. 2. In the same figure, the power loss per unit volume [due to neoclassical diffusion (discussed below) and Bremstrahlung radiation] as a function of temperature appears as the dashed curve. (The power loss due to turbulent convection is not included in this dashed curve but its effect on thermal equilibrium is disclosed below). FIG. 2 indicates that there are two equilibrium solutions. The first (point A) is thermally unstable. If the plasma temperature decreases slightly, the neoclassical diffusion and Bremsstrahlung radiation losses will begin to dominate and hence the plasma temperature will decrease to zero. On the other hand, if there is a slight increases in plasma temperature, the alpha-particle heating power will dominate and thus the plasma temperature will proceed on a thermal excursion until the loss rate matches the heating power at a stable thermal equilibrium, which is the second equilibrium solution (point C). (Similar discussions for tokamak reactors have been given by Conn, *Fusion,* Academic Press, N.Y. (1981), and by Kolesnichenko and Reznik, Plasma Physics and Controlled Nuclear Fusion Research, 1976, Proc., 6th Int. Conf. Berchtesgaden, 1976, vol. 3, IAEA, Vienna 1977, 347.) Thus, to start a stellarator reactor, it is only necessary to raise the plasma temperature to the unstable equilibrium at point A, even if the desired operating condition at the stable equilibrium is at a higher temperature. It is interesting to note that if $a_0$ is reduced to 1.5 m, but all the other reactor parameters remain unchanged, then the stable thermal equilibrium occurs at some temperature between 7–8 keV. The stable thermal equilibrium (point C) in FIG. 2 requires a plasma temperature of approximately 11 keV. If $\beta_c=19.3\%$, then $\beta$ at point C exceed $\beta_c$. As a result, pressure driven turbulent convection will increase the power loss, raise the loss curve, and force the stable equilibrium to occur at a lower plasma temperature (point B) such that $\beta\approx\beta_c$. (As $\beta$ approaches $\beta_c$, the plasma will follow the broken curve in FIG. 2).

After adiabatic compression, due to the increase in both the alpha-particle heating power and the power losses, the solid curve in FIG. 2 shifts upward and the equilibrium point shifts toward higher plasma temperature and power (the upper-right hand corner). As discussed below, the increase in the alpha-particle heating power is greater than the increase in the power losses. This implies that, immediately after compression the plasma temperature is located somewhere between the corresponding thermal equilibria (points A and B) of the shifted curves. Consequently, the plasma temperature continues to rise until it reaches a new stable equilibrium.

Before the compression, the ignited plasma 16 is in thermal balance, at a stable thermal equilibrium. The plasma $\beta$ is slightly above $\beta_c$. Thus, the plasma pressure gradient exceeds the critical pressure gradient by a small amount. Turbulent convective cells are driven by this excess pressure gradient and carry part of the outward particle and energy fluxes as discussed by Ho and Kulsrud, PPPL-2251; the rest of the fluxes are carried by neoclassical transport as discussed by Ho and Kulsrud, PPPL-2253. This is stage 0 in the power cycle. The plasma and magnetic field parameters are:

| | |
|---|---|
| Plasma $\beta$ | $\beta_0 = \beta_c$, |
| Plasma pressure | $P_0$, |
| Plasma minor radius: | $a_0$, |
| Internal magnetic field: | $B_{i0}$, |
| External magnetic field: | $B_{e0}$. |

The subscript 0 refers to the physical quantities at stage 0.

During the compression phase from stage 0 to stage 1, the plasma 16 is compressed adiabatically as the external toroidal magnetic field strength 14 is increased. Adiabatic compression occurs if the compression time is shorter than the burn time (the time for the thermonuclear alpha-particles to increase the plasma temperature by an amount comparable to itself). It is important for the compression to be adiabatic because otherwise, the alpha-particles could heat up the plasma and more work would be required during the compression phase. On the other hand, as explained below, the compression phase must be carried out slowly compared with $\tau_i$ and $\tau\alpha$ (the 90° deflection times for ions and alpha-particles) so that the compression is three-dimensional.

The plasma $\beta$ decreases during the compression because the internal magnetic field pressure increases faster than the plasma kinetic pressure. This can be shown explicitly if the plasma $\beta$ is expressed in terms of $P_0$ and $B_{i0}$. Using the adiabatic compression law ($PV^\gamma=$const with $\gamma=5/3$), the definition of $\beta$, and the frozen flux condition, the plasma $\beta$ can be expressed as $$\beta(t) = \frac{P_0}{(B_{i0}^2/8\pi)} \frac{1}{r_v^{2/3}} = \frac{\beta c}{r_v^{2/3}}$$

Here $r_v(t)=a_0/a(t)$ is the compression ratio. During the compression, $r_v$ increases from unity to $a_0/a$, and thus $\beta$ decreases. If $\beta_c$ is roughly constant, then the plasma $\beta$ is below $\beta_c$ after compression. This is stage 1 in the power cycle. The plasma and magnetic field parameters are:

| | |
|---|---|
| Plasma $\beta$: | $\beta_1 < \beta_0 = \beta_c$, |
| Plasma pressure: | $P_1 > P_0$, |
| Plasma minor radius: | $a_1 < a_0$, |
| Internal magnetic field: | $B_{i1} > B_{i0}$, |
| External magnetic field: | $B_{e1} > B_{e0}$. |

The subscript 1 refers to the physical quantities at stage 1.

After the adiabatic compression, the increase in alpha-particle heating power per unit volume is larger than the increase in neoclassical energy diffusion and Bremsstrahlung radiation losses per unit volume. Also, turbulent convective transport can be assumed to be absent after compression since $\beta$ is less than $\beta_c$. This imbalance between the heating power and the power loss causes the plasma temperature to increase while the plasma volume is kept constant by further increasing the external magnetic field strength 14. The increase in temperature can be understood in more detail from the volume-averages energy balance equation $$3n\frac{dT}{dt} = P_\alpha(t) - [P_{neo}(t) + P_{conv}(t) + P_x(t)]. \quad (2)$$

The first term on the right-hand side of this equation is the heating power from the thermonuclear alpha-particles. The first term inside the bracket is the energy loss rate due to neoclassical diffusion, i.e.

$$P_{neo} = \frac{3}{2}\frac{nT}{\tau_\epsilon^e} + \frac{3}{2}\frac{nT}{\tau_\epsilon^i}. \quad (3)$$

As discussed by Ho et al., PPPL-2253, the electron energy confinement time is $$\tau_\epsilon^e = 10^{-5}\frac{n_{14}B_4^2R_m^2a_m^2}{(5.4 + C)(2\epsilon_h(r))^{3/2}T_4^{7/2}}\ \text{sec} \quad (4)$$

and the ion energy confinement time is $$\tau_E^i \cong \tau_E^e.$$

Here the minor radius $a_m$ and the major radius $R_m$ are in meters, $B_4$ is in 10KG, electron or ion density $n_{14}$ is in $10^{14}\ cm^{-3}$, plasma temperature $T_4$ is in 10 keV, $\epsilon_h$ is the depth of the helical magnetic well caused by external helical windings, and the normalized ambipolar electric field strength $C \cong (e/T)(\partial\Phi/\partial r)n(\partial n/\partial r)^{-1}$ can be approximated by unity. The second term inside the bracket in Eq. (2) is the convective energy loss rate. The last terms is the energy loss rate due to Bremsstrahlung radiation and is equal to $cn^2\sqrt{T}$, with "c" a constant. Note that density is not a function of time during the heating phase since the plasma volume is held fixed. Also note that before the compression, thermal balance means that $dT/dt=0$. The ratio of the value of each term on the right-hand side of Eq. (2) after the adiabatic compression to the value of the corresponding term before the compression will now be studied. Because of the increase in plasma density and temperature after the adiabatic compression, the rate of thermonuclear alpha-particle energy production is larger than that before the compression by the ratio $$\frac{P_\alpha(t_1)}{P_\alpha(t_0)} = \frac{n_1^2 <\sigma v>_1 3.5\ \text{MeV}}{n_0^2 <\sigma v>_0 3.5\ \text{MeV}} = r_v^4\frac{<\sigma v>_1}{<\sigma v>_0}. \quad (5)$$

Here 3.5 MeV is the energy of an alpha-particle generated from D-T reactions, and $<\sigma v<_0$ and $<\sigma v>_1$ are the Maxwellian reactivities at stage 0 and stage 1, respectively. If $r_v=1/0.6$ amd $T_0=10$ keV, then $T_1=19.8$ keV. Using the formula for $<\sigma v>_{D\text{-}T}$ given in *NRL Plasma Formulary* (D.L. Book Ed.), Naval Research Laboratory, Washington, D.C. (1980), Eq. (5) has a value of 32.1. To obtain the ratio of the neoclassical energy loss rate per unit volume after the compression to that before the compression, we let $P_{neo} \cong 3nT/\tau^e$. Then, it can be shown that $$\frac{P_{neo}(t_1)}{P_{neo}(t_0)} = r_v^4 \quad (6)$$

which has a value of 7.72 for $r_v=1/0.6$. The turbulent convective transport is assumed to vanish at the end of the compression phase since $\beta$ drops below $\beta_c$. Finally, the ratio of the Bremsstrahlung radiation energy loss rate after compression to that before the compression is $$\frac{P_x(t_1)}{P_x(t_0)} = r_v^{14/3} \quad (7)$$

which has a value of 10.85 for $r_v=1/0.6$. From Eqs. (5)–(7), we can conclude that alpha-particle heating will further increase the plasma temperature after the adiabatic compression since the relative increase in the alpha-particle heating power is larger than the relative increase in the energy loss rates. This phenomenon of plasma temperature rise after compression is of fundamental importance to the success of the power cycle of the present invention, since the plasma must have a higher pressure during the expansion phase than during the compression. As the temperature rises, the plasma $\beta$ increases since the plasma volume is held fixed. As $\beta$ approaches $\beta_c$, the convective energy loss re-emerges and the convective energy loss rate gradually catches up with the increase in the alpha-particle heating power. After the compression, the plasma temperature asymptotically approaches the limit at which $\beta=\beta_c$ in a characteristic time defined as the "thermal relaxation time" (see FIG. 7). At stage 2 in the power cycle, the plasma is again thermally stable and in thermal balance, at a stable equilibrium. The plasma and magnetic field parameters are:

| | |
|---|---|
| Plasma $\beta$ | $\beta_2 = \beta_c$, |
| Plasma pressure: | $P_2 > P_1$, |
| Plasma minor radius: | $a_2 = a_1$, |
| Internal magnetic field: | $B_{i2} = B_{i1}$, |
| External magnetic field: | $Be_2 > B_{e1}$. |

To complete the cycle, the external magnetic field 14 is decreased so that the plasma 16 expands back to its original minor radius. This is the expansion phase. When the plasma expands, the plasma $\beta$ tends to increase. [According to Eq. (1), $\beta$ increases as $r_v$ decreases]. However, $\beta$ is already at $\beta_c$ at stage 2, hence ballooning instabilities force $\beta$ to stay at $\beta_c$ (recall that $\beta_c$ is assumed to be a constant) through turbulent convection during the entire expansion phase. Consequently, the plasma pressure during the expansion phase can be expressed as $$P(t) = \beta_c\frac{B_i^2(t)}{8\pi}.$$

Upon applying the frozen flux condition, this expression can be written as $$P(t) = P_0\frac{V_0^2}{V^2(t)} \quad (8)$$

which varies exactly as though it has an adiabatic index $\gamma=2$. As a result, the plasma pressure during the expansion is higher than the corresponding pressure during the compression. Therefore, negative work is done on the plasma 16 during a completer cycle. This work manifests itself as a mean back-voltage in the toroidal field coils 12, and direct electrical energy is obtained from this voltage. This electrical energy may be transfered to a load 17 via line 32. Using the pressure-volume (P-V) relation, the amount of work done on coils and the thermal efficiency of the cycle are calculated below. It is now clear that if the compression phase has been carried out faster than $\tau_i$, then the compression would be two-dimensional ($\gamma=2$) and the pressure variation during the compression would follow Eq. (8) instead of $PV^{5/3}=\text{const}$. Consequently, no net work would be done on the external system since the plasma pressure during the compression phase would equal the corresponding pressure during expansion.

Finally, the cycle described here satisfies the Kelvin-Planck statement of the second law of thermodynamics by losing heat (obtained from thermonuclear alpha-particles) to the outside through turbulent convection.

During the heating phase, between stages 1 and 2, the plasma can either be held at constant volume or be allowed to expand at constant pressure while receiving energy from the thermonuclear alpha-particles. In a complete cycle, both methods result in net work done on the external system. The work done and thermal efficiency for each of these methods are now calculated.

The preferred embodiment of the thermonuclear inverse magnetic pumping power cycle with heating phase at constant plasma volume is discussed first. To calculate the amount of work delivered during this cycle, it is only necessary to consider the work performed by the plasma during the compression and expansion phases. No work is performed during the heating phase because the plasma volume is constant.

The work done on the plasma during the adiabatic compression is $$\begin{aligned} {}_0W_1 &= \int_{V_0}^{V_1} P\,dV \\ &= -\frac{3}{2} P_0 V_0^{5/3}\left[\frac{1}{V_1^{2/3}} - \frac{1}{V_0^{2/3}}\right]. \end{aligned}$$

Invoking $P_0=\beta_c B_{i0}^2/8\pi$ and the pressure balance equation $P_0+B_{i0}^2 8\pi=B_{e0}^2/8\pi$, $P_0$ can expressed as $$P_0 = \frac{\beta_c}{1+\beta_c}\,\frac{B_{e0}^2}{8\pi}. \tag{9}$$

Using this expression, ${}_0W_1$ can be written as $${}_0W_1 = -\frac{3}{16}\,a_0^2 L(r_v^{4/3}-1)\frac{\beta_c}{1+\beta_c}\,B_{e0}^2 \tag{10}$$

where $L=2\pi R$ is the length of the system. The work done by the plasma during the expansion phase is calculated by using Eqs. (8) and (9). The result is $$\begin{aligned} {}_2W_0 &= \int_{V_2}^{V_0} P\,dV \\ &= \frac{1}{8}\,a_0^2 L(r_v^2-1)\frac{\beta_c}{1+\beta_c}\,B_{e0}^2. \end{aligned} \tag{11}$$

Therefore, the amount of net work done on the coils during a complete cycle is $$\begin{aligned} W_{net} &= {}_0W_1 + {}_2W_0 \\ &= \frac{1}{8}\,a_0^2 L\left[r_v^2 - \frac{3}{2}\,r_v^{4/3} + \frac{1}{2}\right]\frac{\beta_c}{1+\beta_c}\,B_{e0}^2. \end{aligned} \tag{12}$$

Figure 3:
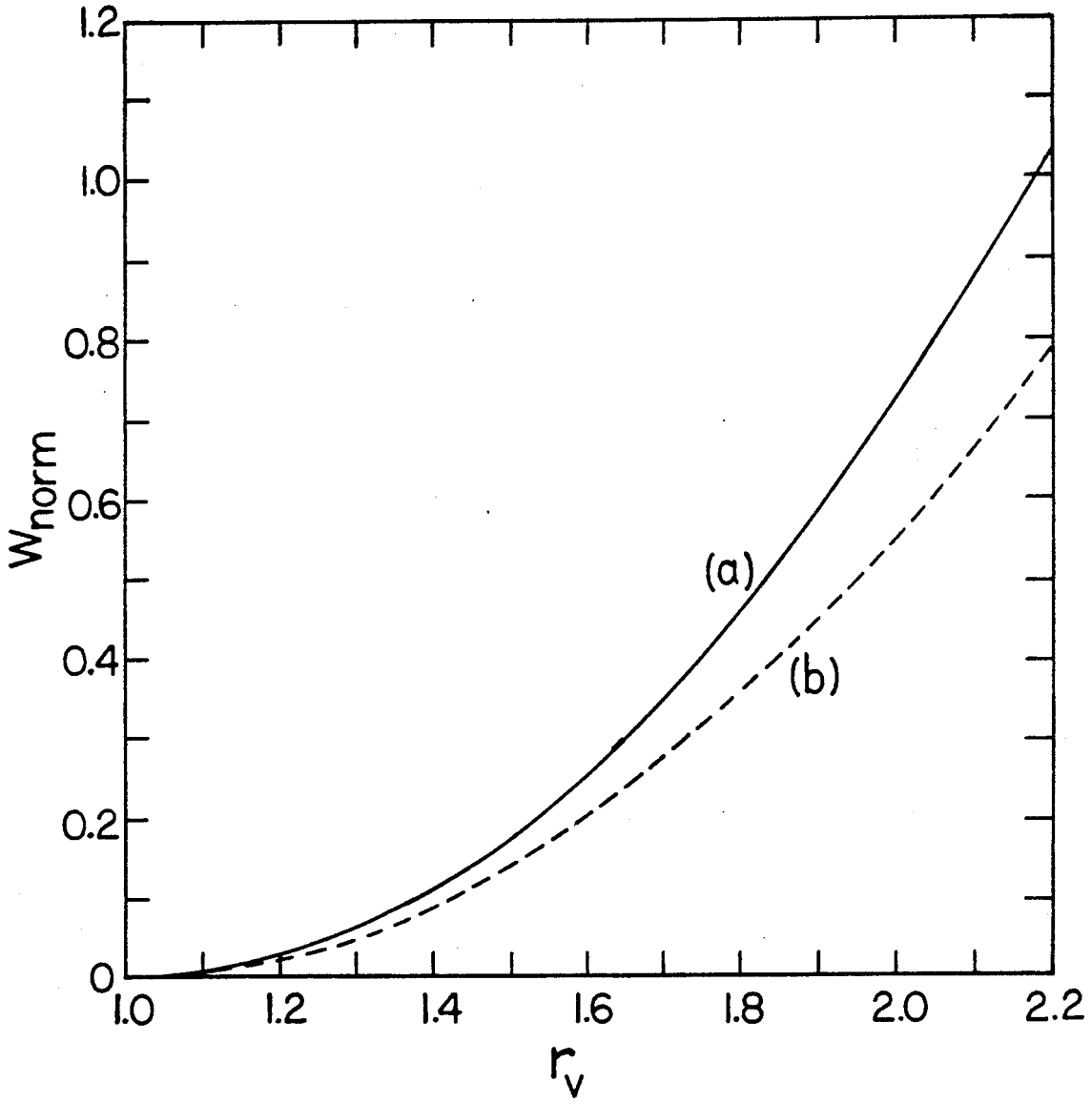
FIG. 3 shows the net work done normalized to machine dependent parameters.
Figure 4:
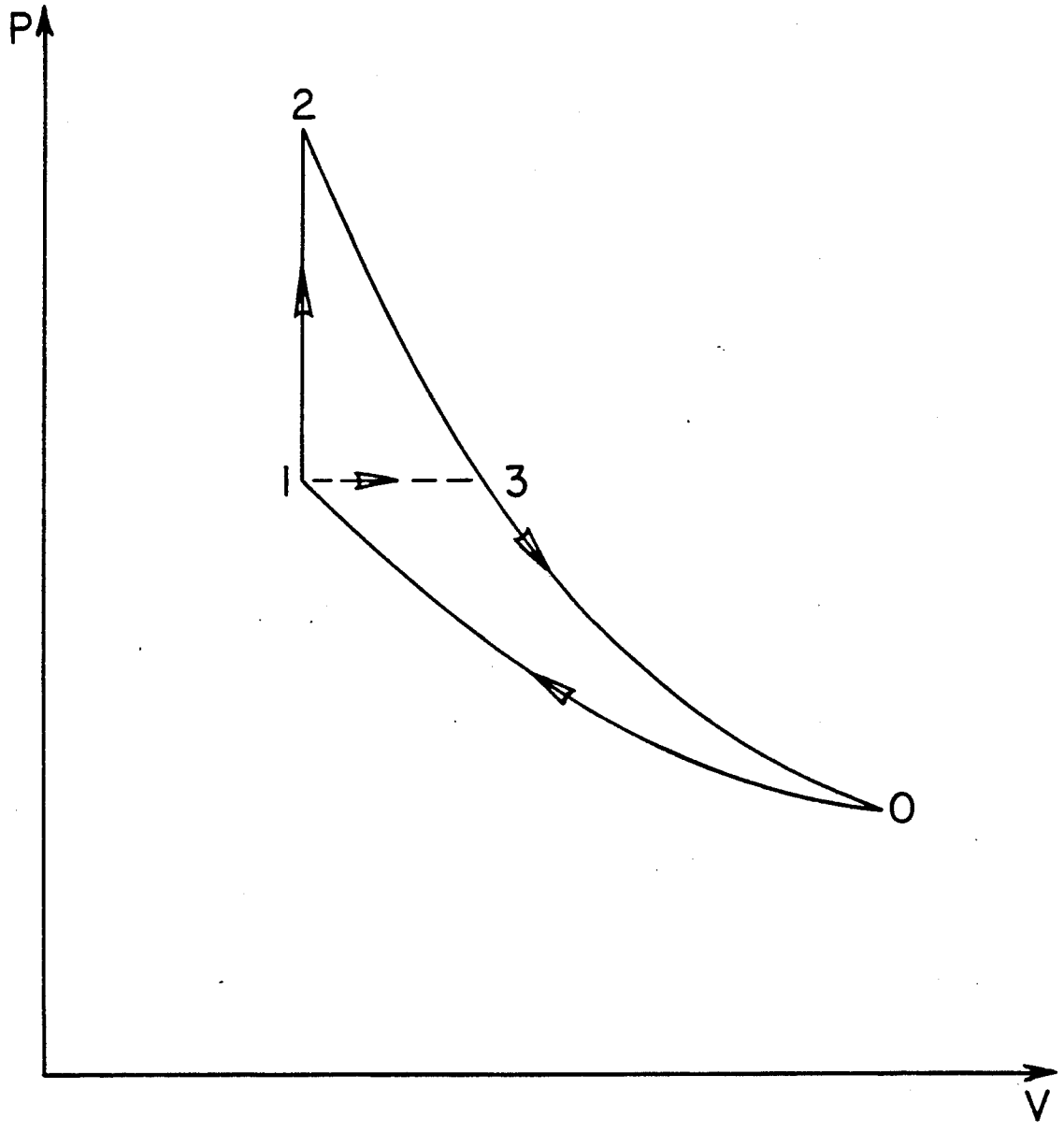
FIG. 4 is a pressure-volume (P-V) schematic for the cycles of the present invention.

This expression shows that either a higher compression ratio or a larger $\beta_c$ will give a larger amount of delivered work. The net work done normalized by the machine dependent parameters $(1/8)a_0^2L\beta_c[1/(1+\beta_c)]B_{e0}^2$ is $$W_{norm} = r_v^2 - \frac{3}{2}\,r_v^{4/3} + \frac{1}{2}$$

which is plotted versus the compression ratio in FIG. 3. Although it is desirable to operate the cycle at a high compression ratio, the attainable compression ratio may depend on the highest achievable toroidal magnetic field. This field is limited by the allowable static and dynamic loading on the machine structure. The amount of work delivered by the cycle can be represented by the area of the triangle 0-1-2 in the pressure-volume diagram shown if FIG. 4.

The performance of this cycle is characterized by the thermal efficiency $\eta_{th}$ which is defined as $$\eta_{th} = \frac{W_{net}}{Q_H} \tag{13}$$

where $O_H$ represents the heat obtained by the cycle (engine) from a heat source (thermonuclear alpha-particles). To calculate the heat received by the plasma during the heating phase, use the first law of thermodynamics, $$Q_H = {}_1U_2 + {}_1W_2. \tag{14}$$

Here ${}_1U_2$ is the change in plasma internal energy between stages 1 and 2 and can be expressed as $${}_1U_2 = 3\,a_0^2 L n_0\,(T_2 - T_1).$$

Since the plasma volume is held fixed during the heating phase, $Q_H={}_1U_2$. From $P_2=\beta_e B_{i2}^2/8\pi$, the frozen flux condition, and the adiabatic compression law, it can be shown that $$Q_H = \frac{3}{16}\,a_0^2 L(r_v^2 - r_v^{4/3})\frac{\beta_c}{1+\beta_c}\,B_{e0}^2. \tag{15}$$

Using Eqs. (12) and (15), the thermal efficiency can be expressed as $$\eta_{th} = 1 - \frac{1}{3}\,\frac{r_v^2 - 1}{r_v^2 - r_v^{4/3}}. \tag{16}$$

The important thing to note is that the efficiency of this cycle is a function only of the compression ratio and increases with it. The thermal efficiency is plotted versus the compression ratio in FIG. 5. As the compression ratio approaches infinity, the thermal efficiency approaches a value of $\frac{2}{3}$.

Figure 6:
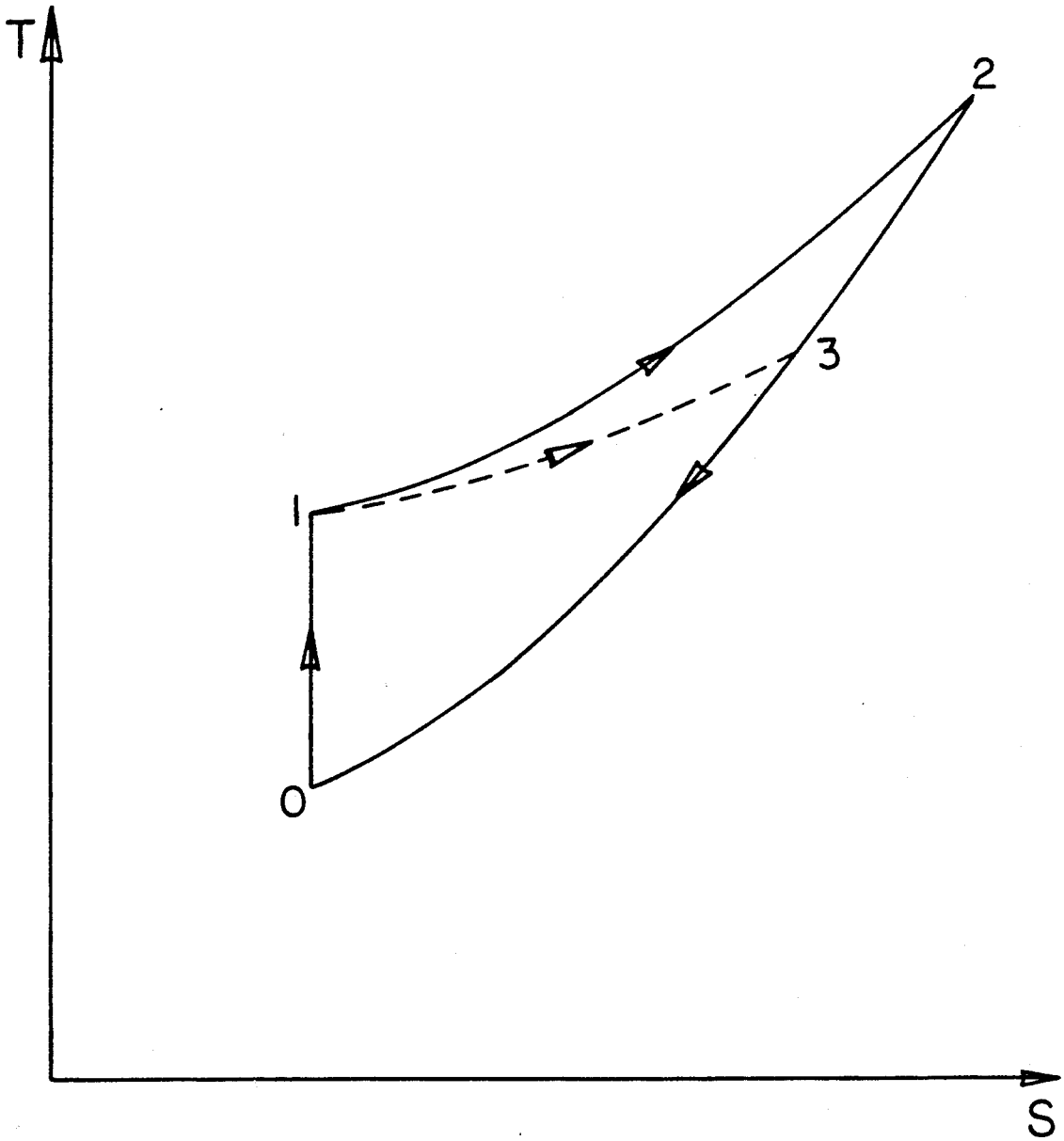
FIG. 6 is a temperature-entropy (T-S) schematic for the cycles of the present invention.

The thermal efficiency can be visualized by looking at the temperature entropy (T-S) diagram for the cycle, FIG. 6. The thermal efficiency is the ratio of the area of the triangle 0-1-2 to the area beneath the path 1-2.

Up to this point, the discussions have been restricted to the case in which there is a limiting $\beta$. However, the cycle will become more efficient and more work can be obtained if $\beta_c$ is very high or if there is actually no $\beta$ limit (this situation may occur in a heliac). For this case the work required to compress the plasma is given by Eq. (10). The plasma pressure at stage 2 may now reach a higher value than in the case where there is a $\beta$ limit. [Note that turbulent convection is absent here since there is no $\beta$ limit.] During the expansion, the plasma pressure variation follows $PV^{5/3}=\text{const}$ since $\beta$ will no longer be prevented from rising. Hence, $$_2W_0 = \frac{3}{2}\pi a_0^2 L(r_v^{4/3} - 1)P_0,$$

where the subscript 0' denotes conditions at stage 0'—the moment when the expansion phase is completed and the plasma volume returns to its original value at stage 0. At stage 0', $P_{0'}>P_0$ and the power losses are greater than the alpha-particle heating power. Thus, the plasma temperature will decrease. While the temperature is decreasing, the external magnetic field is reduced in order to keep the plasma at constant volume and heat diffuses to the outside by neoclassical transport. The cycle is completed when the plasma temperature and external magnetic field return to their original values at stage 0 (point C in FIG. 2).

The net work is $$W_{net} = \frac{3}{2}\pi a_0^2 L(r_v^{4/3} - 1)n_0(T_{0'} - T_0) \tag{17}$$

where $T_{0'}$ can be related to $T_2$ using the adiabatic law.

The thermal efficiency is $$\eta_{th} = 1 - \frac{1}{r_v^{4/3}} \tag{18}$$

which is the Otto cycle efficiency. Note that this cycle is identical to the Otto cycle.

The preferred embodiment of the thermonuclear inverse magnetic pumping power cycle with heating phase at constant plasma pressure is now discussed. In this power cycle, the compressed plasma is allowed to expand at constant pressure until the plasma $\beta$ reaches $\beta_c$. At this point (stage 2), the plasma radius is between the minor radius before the compression and that after the compression. Next, the plasma column is expanded further with $\beta$ staying at $\beta_c$ until the minor radius reaches the pre-compression value. The cycle is now complete.

To calculate the amount of work delivered during this cycle, note that the work required to compress the plasma is the same as that of the previous cycle, see Eq. (10). To calculate the work done by the plasma on the confining field ($_1W_2+{}_2W_0$), it is necessary to know the plasma minor radius at the end of the constant pressure heating phase. Starting with $P_2=\beta_c B^2_{i2}/8\pi$, using the frozen flux condition, and noting that $P_2=P_1$, it can be shown that $$a_2=a_0 r_v^{-5/6}. \tag{19}$$

The work done by the plasma on the coils during the constant pressure heating phase is $$\begin{aligned} {}_1W_2 &= \int_{V_1}^{V_2} P\,dV \\ &= \pi L r_v^{10/3}(a_2^2 - a_1^2)P_0 \\ &= \frac{1}{8} a_0^2 L r_v^{4/3}(r_v^{1/3} - 1)\frac{\beta_c}{1+\beta_c} B_{e0}^2. \end{aligned}$$

Using Eq. (9), the work done by the plasma during the final constant $\beta_c$ expansion phase is $$\begin{aligned} {}_2W_0 &= \int_{V_2}^{V_0} P\,dV \\ &= \frac{1}{8} a_0^2 L(r_v^{5/3} - 1)\frac{\beta_c}{1+\beta_c} B_{e0}^2. \end{aligned}$$

Therefore, the amount of net work done on the coils 12 during a completer cycle is $$\begin{aligned} W_{net} &= {}_0W_1 + {}_1W_2 + {}_2W_0 \\ &= \frac{1}{8} a_0^2 L \frac{\beta_c}{1+\beta_c} B_{e0}^2 W_{norm} \end{aligned} \tag{20}$$

where $W_{norm}=2\,r_v 45/3-(5/2)r_v^{4/3}+\frac{1}{2}$ is plotted versus the compression ratio in FIG. 3. Again, the amount of work delivered by this cycle is represented by the area of the triangle 0-1-3 in the pressure-volume diagram, FIG. 4.

The thermal efficiency, which again depends only on the compression ration, is $$\eta_{th} = 1 - \frac{1}{5}\,\frac{r_v^{5/3} - 1}{r_v^{5/3} - r_v^{4/3}}. \tag{21}$$

Figure 5:
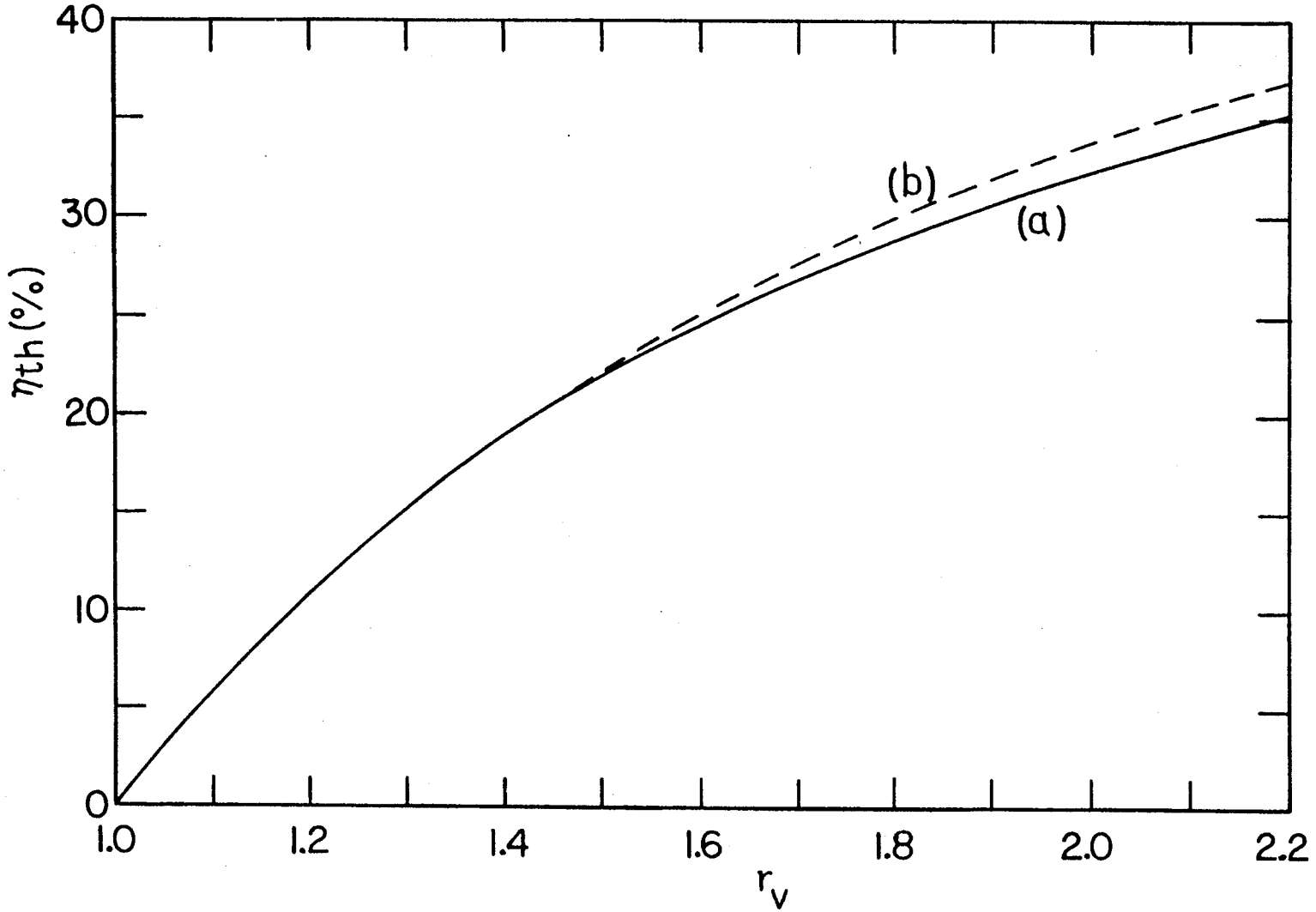
FIG. 5 shows a graph of the thermal efficiency versus the compression ratio for the cycles of the present invention.

The thermal efficiency is plotted versus the compression ratio in FIG. 5. As the compression ratio approaches infinity, the thermal efficiency approaches a value of 4/5. Now, the thermal efficiency is the ratio of the area of triangle 0-1-3 to the area beneath the path 1-3 in FIG. 6. Thus, for the same compression ration, this cycle delivers less work but at a higher thermal efficiency than the previous cycle. From the standpoint of reactor economics, it is probably the net work done, rather than the thermal efficiency, that is important.

The power delivered by the power cycle via direct energy conversion depends on the period of the cycle. One of the major factors that governs the period is the thermal relaxation time, i.e. time for the plasma $\beta$ to reach $\beta_c$ after adiabatic compression. The rate of energy transfer of an individual alpha-particle to the background plasma 16 is now considered. The time evolution of the plasma temperature after the compression is also studied using the volume-averaged energy equation for electrons. From the numerical solution of this equation, the thermal relaxation time is estimated.

The rate of thermonuclear alpha-particle energy transferred to the background plasma is given by Trubnikov, Review of the Plasma Physics (M. A. Leontovich, Ed.), Consultant Bureau, New York (1965), vol. 1, in the form $$\frac{d\epsilon_\alpha}{dt} = -\frac{\epsilon_\alpha}{\tau^{\alpha/D}} - \frac{\epsilon_\alpha}{\tau^{\alpha/e}} \tag{22}$$

where $\epsilon_\alpha$ is the alpha-particle energy, and $\tau^{\alpha/D}$ and $\tau^{\alpha/e}$ are, respectively, the characteristic energy transfer time between the alpha-particle and electrons, and the characteristics energy transfer time between the alpha-particle and electrons. In this analysis, we assume $T = T_e = T_i$. To obtain the characteristic energy transfer time, not that after the compression (at stage 1), the plasma with stage 0 parameters give in Table I has $n_1 = 16.7 \times 10^{14}$ cm$^{-3}$ and $T_i = 19.8$ keV if $r_v = 1/0.6$. Thus $$\frac{\epsilon_\alpha(0)}{T_1} = 176.8 >> 1$$

and $$\frac{m_e \epsilon_\alpha(0)}{m_\alpha T_1} = 0.02 << 1$$

where $\epsilon_\alpha(0) = 3.5$ MeV is the energy of an alpha-particle generated from D-T reactions, and $m_e$ and $m_\alpha$ are the electron and alpha-particle mass, respectively. Using these limits, the expressions for $\tau^{\alpha/e}$ can be simplified accordingly. Trubnikov, cited above, showed that $$\tau^{\alpha/D} = \frac{m_\alpha 1/2}{4\sqrt{2}\,\pi\, e^4} \; \frac{\epsilon_\alpha^{3/2}}{n \ln\Lambda} \tag{23}$$

and $$\tau^{\alpha/e} = \left[ \frac{\sqrt{\pi}/4}{2\epsilon_\alpha/3T} \left( \frac{m_\alpha T}{m_e \epsilon_\alpha} \right)^{\frac{1}{2}} \right] \tau^{\alpha/D}. \tag{24}$$

For $\epsilon_\alpha(0) = 3.5$ MeV, it can be shown that $\tau^{\alpha/e} = \tau^{\alpha/D}/57$. Thus, at the time of birth of an alpha-particle, the rate of energy transfer to the electrons is about sixty times faster from an alpha-particle that to the deuterons. At the critical energy given by $$\epsilon_{\alpha crit} = \left( \frac{3\sqrt{\pi}}{8} \right)^{\frac{2}{3}} \left( \frac{m_\alpha}{m_e} \right)^{\frac{1}{3}} T$$

the rate of energy transfer from an alpha-particle to the electrons is equal to that to the ions. At $T_1 = 19.8$ keV, $\epsilon_{\alpha crit} = 0.29$ MeV. Thus, the thermonuclear alpha-particles lose most of their energy to electrons and for practical purposes, the alpha-particles energy transfer rate can be approximated by $$\frac{d\epsilon_\alpha}{dt} = -\frac{\epsilon_\alpha}{\tau^{\alpha/e}}. \tag{25}$$

Using Eqs. (23) and (24), the characteristics energy transfer time can be expressed as $$\tau^{\alpha/e} = 1.7 \times 10^{-1} \frac{T_4^{3/2}}{n_{14}} \text{ sec.} \tag{26}$$

Substituting the values of density and temperature of the plasma immediately after the compression that Eq. (26) gives $\tau^{\alpha/e} = 0.05$ sec. Note that using Eq. (4), it can be shown that after the compression, the plasma energy confinement time $\tau_\epsilon \cong 0.32$ sec. Hence $\tau^{\alpha/e} < \tau_\epsilon$.

To obtain the temporal evolution of the plasma temperature after the compression, assume $T_e = T_i$ and use the volume-averaged energy balance equation for the plasma:

$$3n_1 \frac{dT}{dt} = P_\alpha(t) - [P_{neo}(t) + P_x(t)]. \tag{27}$$

In this equation, the turbulent convective energy loss is not included since we have assumed that there is no convective loss for $\beta < \beta_c$ (in reality, however, convective loss emerges gradually as $\beta$ approaches $\beta_c$ as was mentioned above). Let the time at the end of the compression phase be zero. Then, the power deposited by the alpha-particles to the background plasma per unit volume, P (t), at any time t after the compression can be expressed as $$P_\alpha(t) = -\int_0^t dt'\, r_v^4 \frac{n_0^2}{4} \langle\sigma v\rangle_{t'} \frac{d\epsilon_\alpha}{dt}(t,t') - \int_{-\infty}^0 dt' \left( \frac{1 + 2r_v^2}{3} \right) r_v^4 \frac{n_0}{4} \langle\sigma v\rangle_{t'} \frac{d\epsilon_\alpha}{dt}(t,t'). \tag{28}$$

Here the first term on the right-hand side of this equation represents the alpha-particle power deposition at any time $t > 0$ by all the alpha-particles generated in some intermediate time between $0 \leqq t' \leqq t$ ($0 \geqq t' \geqq -\infty$); $n_0$ is the density before the compression, and $d\epsilon_\alpha(t,t')/dt$ [given by Eq. (23)] represents the rate of energy transfer at time t, of an individual alpha-particle generated at some previous time t'. The factor $(1+2r_v^2)/3$ in the second term is the increase in alpha-particle energy due to two-dimensional adiabatic compression (compression is two-dimensional if the compression phase is carried out faster than $\tau_{\alpha i}$— and 90° deflection time between an alpha-particle and background ions).

Equation (27) is an integrodifferential equation, but it can be converted into a second order differential equation by taking a time derivative. Using Eqs. (25) and (26), it can be shown that $$\frac{d^2\epsilon_\alpha}{dt^2} = -\frac{1}{\tau^{\alpha/e}} \frac{d\epsilon_\alpha}{dt} - \frac{3}{2}\left[ \frac{1}{T} \frac{dT}{dt} \right] \frac{d\epsilon_\alpha}{dt}.$$

Using this expression, we find that the time derivative of Eq. (28) can be written as $$\frac{dP_\alpha}{dt} = -\frac{P}{\tau^{\alpha/e}} - \frac{3}{2}\left[ \frac{1}{T} \frac{dT}{dt} \right] P_\alpha + r_v^4 \frac{n_0^2}{4} \langle\sigma v\rangle_t \frac{3.5 \text{ MeV}}{\tau^{\alpha/e}}$$

where $\langle\sigma v\rangle_t$ is the Maxwellian reactivity at time t. Then, after taking the time derivative of Eq. (27), using the above expression for $dP\alpha/dt$, and performing some straight forward algebra, it can be shown that $$\tau^{\alpha/e}\frac{d^2T}{dt^2}+\frac{3}{2}\ \frac{\tau^{\alpha/e}}{T}\left(\frac{dT}{dt}\right)^2+\left[1+\frac{\tau^{\alpha/e}}{n_1T}(P_{neo}+P_x)+\frac{1}{3}\ \frac{\tau^{\alpha/e}}{n_1}\ \frac{\partial}{\partial T}(P_{neo}+P_x)\right]\frac{dT}{dt}=\frac{1}{3n_1}\left[(3.5\ \text{MeV})\frac{n_1^2}{4}<\sigma v>_t-(P_{neo}+P_x)\right]. \tag{29}$$

This equation can be solved numerically. Two initial conditions are needed. The first one is $$T(0)=r_v^{4/3}\,T_0 \tag{30a}$$

from the adiabatic law. [Note that T(0) denotes the plasma temperature at time 0 (stage 1) and $T_0$ denotes the plasma temperature at stage 0.] To determine the second initial condition $dT/dt|_{t=0}$, we need to know $P\alpha(0)$. If the adiabatic compression time is faster that $\tau_{\alpha i}$, then the alpha-particle heating power per unit volume immediately after the compression is increased from the corresponding heating power before the compression by the ratio $$\frac{P_\alpha(0)}{P_\alpha(0^-)}=\left(\frac{1+2r_v^2}{3}\right)\frac{n_1^2[\epsilon_\alpha/\tau^{\alpha/e}(0)]}{n_0^2[\epsilon_\alpha/\tau^{\alpha/e}(0^-)]}=\frac{1+2r_v^2}{3}\,r_v^6.$$

Here $0^-$ denotes the time at the beginning of the compression. The second initial condition for Eq. (29) can now be written as $$\frac{dT}{dt}\bigg|_{t=0}=\frac{1}{3r_v^2n_0}\left[\left(\frac{1+2r_v^2}{3}\right)r_v^6\,P_\alpha(0^-)-(P_{neo}+P_x)\bigg|_{t=0}\right]. \tag{30b}$$

Using the initial conditions given by Eqs. (30a) and (30b), the solution of Eq. (29) for the reactor with parameters given in Table I with $r_v=1/0.6$ is obtained and plotted versus time as the solid curve in FIG. 7. This figure shows that the plasma temperature asymptotically approaches a limit of 35.5 keV.

Figure 7:
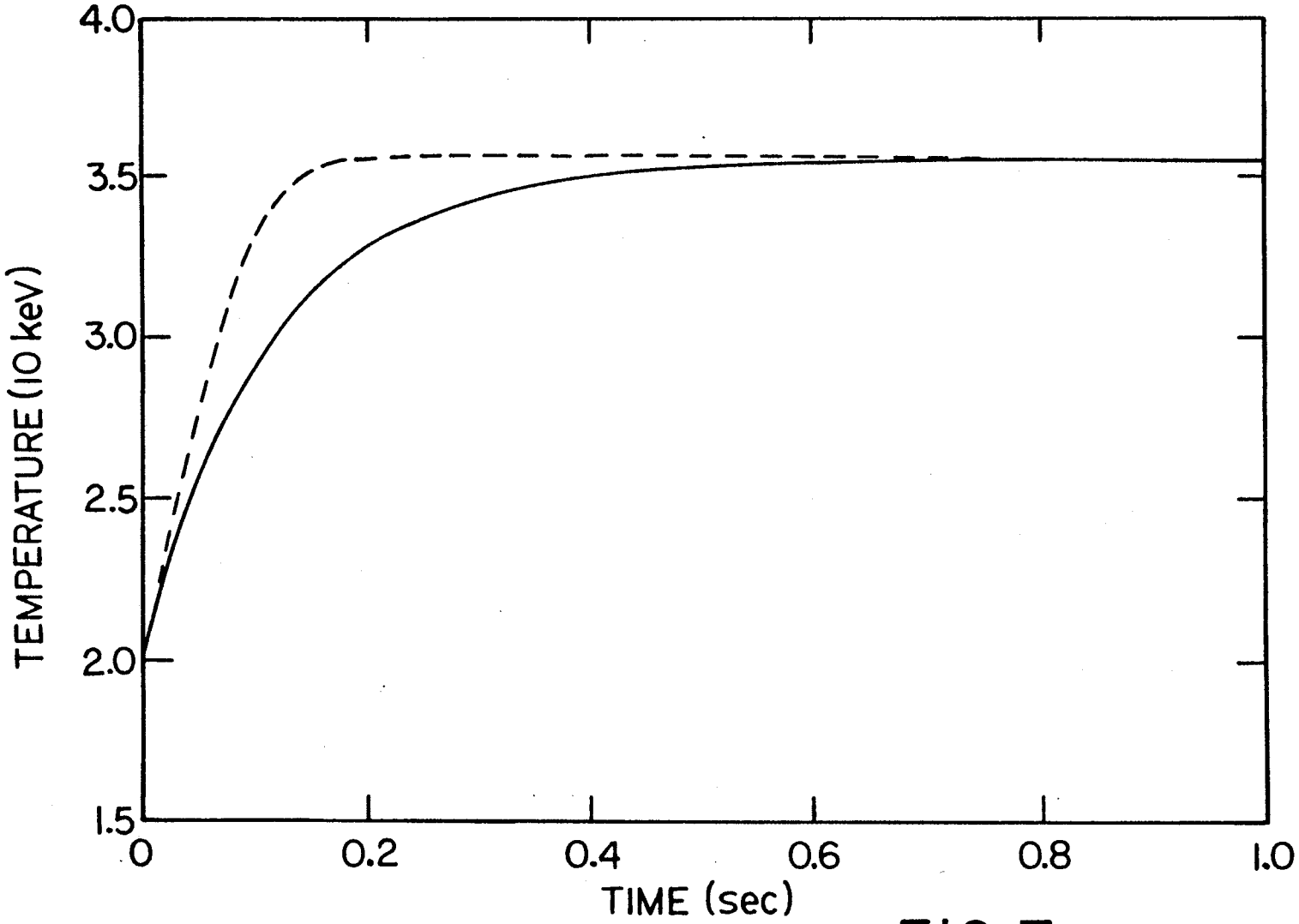
FIG. 7 shows a temporal evolution of the plasma temperature after adiabatic compression, for the reactor with parameters given in Table I.

If we let the thermal relaxation time for the plasma $\beta$ to reach $\beta_c$ be the time that it takes the plasma temperature to reach 90% of the limiting temperature at 35.5 kev, then this time is approximately 0.16, as illustrated in FIG. 7. This condition would represent the end of the heating phase.

Note that the thermal relaxation time is somewhat larger than $\tau^{\alpha/e}$. In the limit that the relaxation time is much greater than $\tau^{\alpha/e}$, Eq. (28) can be simplified by assuming $<\sigma v>_{t'}\approx<\sigma v>_t$. Furthermore, the second term on the right-hand side of Eq. (28) is generally small compared to the first term and thus can be neglected. The power delivered to the plasma now becomes $$P_\alpha(t)=r_v^4\frac{n_0^2}{4}<\sigma v>_t\epsilon_\alpha$$

which is the instantaneous fusion power. This result simplifies Eq. (27) to a first-order equation. The temporal evolution of temperature described by this simplified equation is plotted versus time as the dashed curve in FIG. 7.

Finally, note that if the turbulent convective loss were included in the calculation, then the resulting power loss would be higher due to the turbulent convection as $\beta$ approaches $\beta_c$ and the rate of temperature rise would become slower. However, the thermal relaxation time would probably be about the same, since turbulent convection also forces the asymptotic limit of the plasma temperatures to drop to a lower value at which $\beta=\beta_c$.

To make the power cycle self-sustaining, part of the work done by the plasma on the coils during the expansion phase must be stored in order to supply power for the next compression phase. However, the amount of energy to be stored is large compared with the net work done by the plasma during the cycle. Thus, even if the ratio of the energy lost (during the transfer to, plus the loss in the storage system) to the total energy transferred from the reactor to the storage system (this ratio is defined as the re-circulation inefficiency) is only a few percent, the total energy lost in recirculation may still exceed the work done during the cycle. Consequently, the power cycle may require a lower re-circulation inefficiency than can be provided by conventional energy storage systems, e.g. capactive, inductive, and inertial (motor-generator-flywheel). To obviate this, in a preferred embodiment of the present invention two (or more) stellerator reactors are operated in tandem. The major electrical energy loss in this system is the resistive dissipation in the coils 12, but this loss may be small compared with the net work performed by the cycle as is discussed below.

Figure 8:
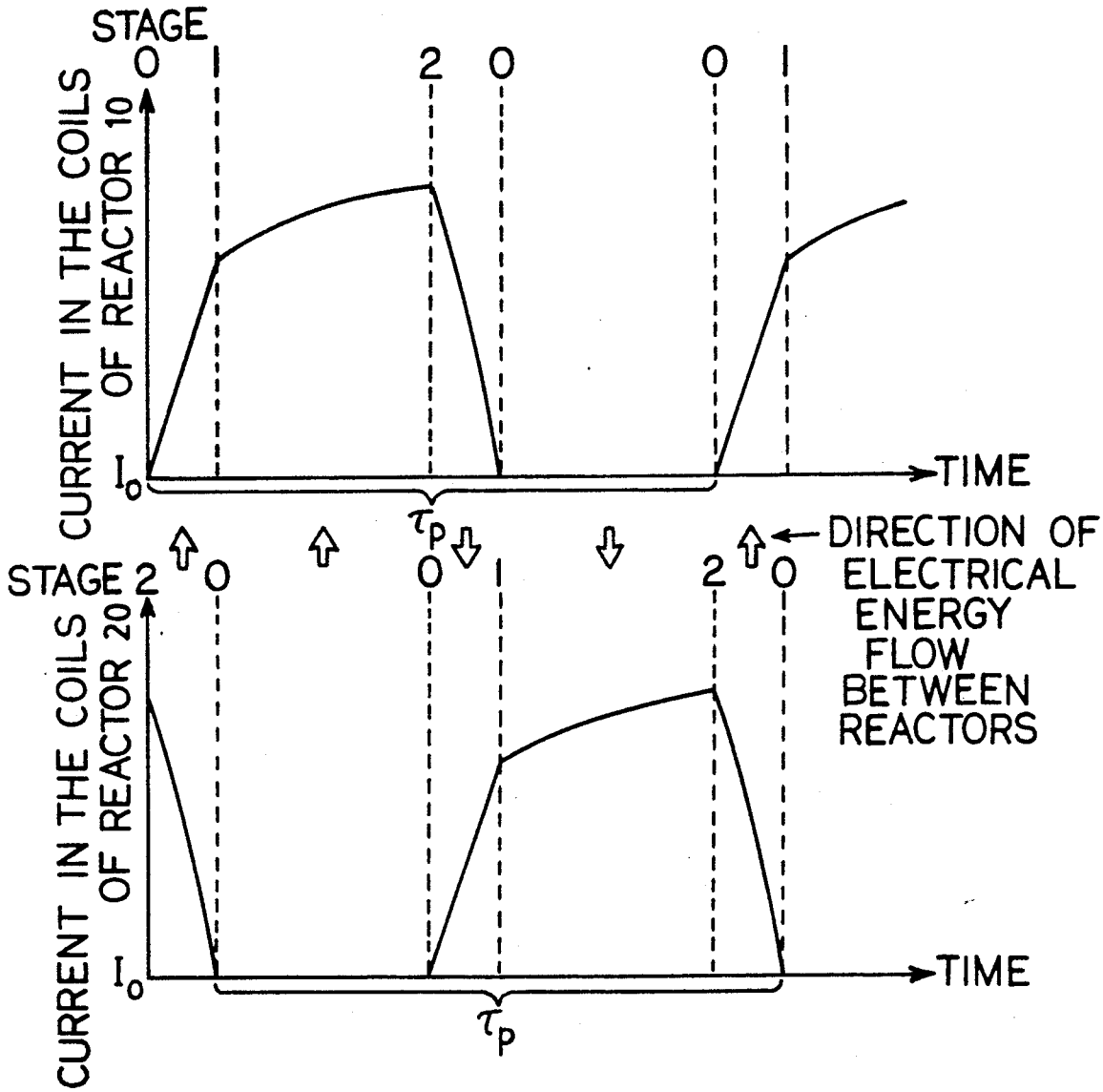
FIG. 8 is a schematic representation of currents in coils and electrical energy flow between reactors as a function of time for a coupled reactor system.
Figure 9:
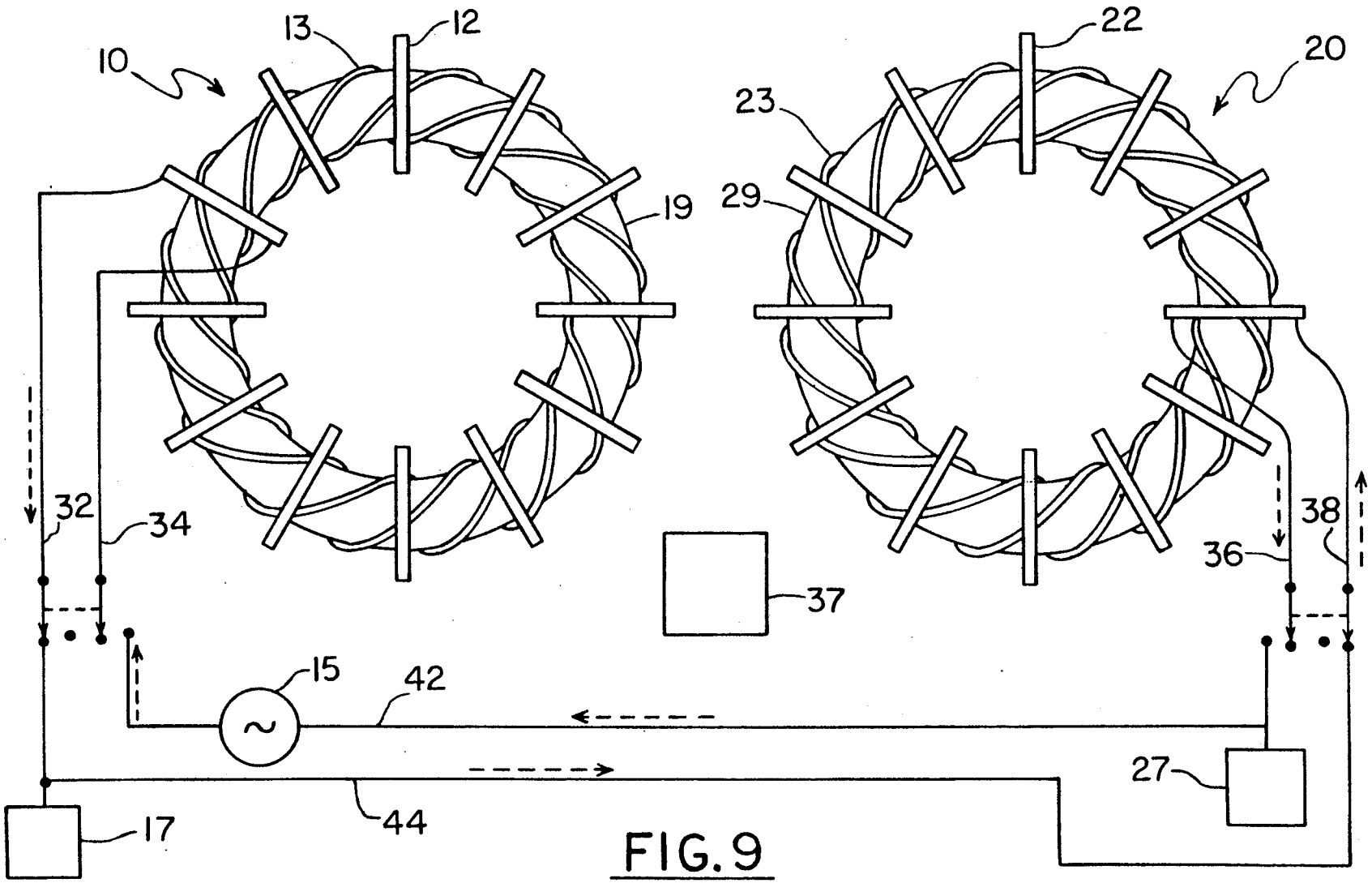
FIG. 9 is a schematic representation of two stellarator reactors coupled together such that the operation of the system is made self-sustaining.

The reactor system of this preferred consists of two identical stellerator reactors, 10 and 20 as shown in FIG. 9. Reactor 20 includes external magnetic confining coils 22, helical stabilizing coils 23 and and vacuum vessel 29. The cycle with heating phase at constant volume will be used for discussion here, however, as will be recognized by those skilled in the art other power cycles may also be used. The operation scenario is illustrated in FIG. 8.

When the plasma in reactor 10 is expanding, some of the resulting work is transferred via line 44 and used to compress the plasma in reactor 20. When the expansion phase in reactor 10 is completed, the plasma in that reactor returns to its precompression state (stage 0) while the plasma in reactor 20 completes the compression phase and is at stage 1. The plasma is reactor 10 is now maintained at stage 0 temporarily while the external magnetic field strength in reactor 20 is increasing so that the plasma volume in reactor 20 can be kept constant as the plasma temperature is increasing. During this period, the power use to increase the magnetic field strength in reactor 20 comes either from the electrical power generated by the thermonuclear neutrons in reactor 10 or from that in reactor 20 itself. When the plasma in reactor 20 reaches thermal balance (stage 2), it is allowed to expand. Some of the resulting work obtained from reactor 20 during its expansion phase is transferred via line 42 and used to compress the plasma in reactor 10. The balance of the energy is transferred to load 27 via line 36. The cycle continues in this manner. The current in the coils 12 and 22 of reactor 10 and 20 respectively as a function of time is illustrated in FIG. 8. Note that this coupled reactor system is analogous to a two cylinder internal combustion engine.

The averaged total electrical output power obtained from direct conversion is defined as $$P_{direct} = \frac{W_{net} - \phi P_l dt}{\tau p}. \tag{32}$$

Here $P_l$ is the resistive power dissipation in the coils, $\tau_p$ is the period of one complete cycle, and $\phi dt$ is the cyclic time integral, i.e. time integration over the period $\tau_p$.

Having generally described the invention, the following specific example is given as further illustration thereof. The power cycle with heating phase at constant plasma volume is considered. Note that the neoclassical energy loss $P_{neo}$, which could in principle be converted into electrically, is not included in Eq. (32). For a stellerator reactor 10 with reactor parameters given in Table I, the thermal relaxation time required by the plasma to reach stage 2 after the adiabatic compression with $r_v=1/0.6$ is approximately 0.16 sec. If the compression and expansion phases are each carried out in 0.01 sec (note that $\tau_i=0(10^{-3})$ sec for the plasma with parameters given in Table I), then $\tau_p \approx 0.18$ sec. With this information and using Eq. (12), it can be shown that $W_{net}/\tau_p=2.2$ GW.

If the plasma radius remains constant, then at r=a, the thermonuclear neutron power $P_n=12.2$ GW. The electrical power obtained from the neutrons at a conversion efficiency $\eta_c=1/3$ is $\eta_c P_n=4.1$ GW. Thus, $W_{net}/\tau_p$ is about 50% of $\eta_c P_n$. Note that $W_{net}/\tau_p$ for each reactor in the coupled stellarator system may be lower than the 2.2 GW since $\tau_p$ for the coupled system is longer (see FIG. 8). Also note that the actual values of $W_{net}/\tau_p$ and $P_n$ should be lower than the results obtained here since the radial profiles of density and temperature must be taken into account properly.

To calculate the resistive power dissipation in the coils, 12, note that $$P_l = \frac{T_{room}}{T_{coil}} I^2 R \tag{33}$$

The factor $T_{room}/T_{coil}$ is an approximation for the thermodynamic efficiency of the refrigeration cycle, i.e.

$$\eta_{th} = \frac{T_{room} - T_{coil}}{T_{coil}}$$

where $T_{room}$ and $T_{coil}$ are the room temperature and the cryogenic temperature of the cooled coils, respectively. The current in the coils 12 is given by $$I = \frac{c}{4\pi} \frac{B_e}{N}$$

where c is the speed of light and N is the number of turns of the coil per meter. The coil resistance is expressed as $$R = \frac{l}{A} \eta$$

where $l = 2\pi a_c LN$ is the total length of the coil ($a_c$ is the distance between the coil and the center of the plasma), A is the coil cross sectional area, and $\eta$ is the resistivity. If b is the width of the coil (measured along the direction of the minor radius), then A=b/N. Thus, Eq. (33) can be written as $$P_l = \frac{c^2}{4} \frac{a_c L}{b} \frac{T_{room}}{T_{coil}} \eta B_e^2 \tag{34}$$

Using the reactor parameters in Table I and setting $a_c=3$ m, b=0.5 m, $T_{room}=293°$ K., $T_{coil}=77°$ K. (the boiling point for liquid nitrogen), it can be shown that the total resistive power dissipation in a copper coil during a complete cycle is on the order of a few percent of $W_{net}$. Hence, $\phi P_l dt$ can be neglected and $\bar{P}_{direct}=2.2$ GW.

It may be thought that more neutron power could be obtained by increasing the confining magnetic field strength 14 and operating the plasma 16 at a higher pressure without pulsing the minor radius. However, this mode of operation is undesirable since the neutron wall load would exceed the present day engineering limit which is below 10 $MW \cdot m^{-2}$.

A power cycle for direct conversion of alpha-particle energy into electricity for stellarator reactors has been described. The direct energy conversion is achieved by alternating compression and expansion of the plasma minor radius.

For the stellarator reactor with parameters given in Table I, the averaged power obtained from the cycle with compression ratio 1/0.6 is about 50% of the electrical power obtained from the thermonuclear neutrons from the same reactor without compressing the plasma. Thus, the cycle provides an alternative scheme for extracting energy from D-T fueled reactors. This scheme can be used either alone or as a supplement to the electrical power generated from thermonuclear neutrons. For advanced neutron-lean fueled reactors, this power cycle may become an important scheme for energy conversion.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The embodiments of the invention in which an exclusive property or privilege is claimed are defined as follows:

1. In a stellarator fusion reactor having a fusion plasma in thermal balance disposed therein and external toroidal magnetic field coils and helical stabilizing coils said fusion plasma including alpha-particles and occupying a volume $V_0$ and said magnetic field coils producing a toroidal confining magnetic field, a method of generating electricity in said external toroidal magnetic fields coil from the energy of said alpha particles, (a) compressing said plasma adiabatically to a volume $V_1$;

(b) maintaining the volume of said compressed plasma at said volume $V_1$ for a time substantially equal to a thermal relaxation time, such that the temperature of said plasma is driven up by thermonuclear alpha-particle heating thereby providing a heated plasma; and (c) expanding said heated plasma to said volume $V_0$ and simultaneously generating, electrical energy in said external toroidal field coils by a back-voltage produced by said expanding plasma.

2. The method of claim 1 wherein the step of compressing said plasma is performed by increasing the toroidal confining magnetic field produced by said toroidal magnetic field coils.

3. The method of claim 2 wherein the step of maintaining the volume of said compressed plasma is performed by further increasing the toroidal confining magnetic field produced by said toroidal magnetic field coils.

4. The method of claim 3 wherein the step of expanding said compressed plasma is performed by reducing the toroidal confining magnetic field produced by said toroidal magnetic field coils.

5. The method of claim 4 wherein said method is repeated cyclically.

6. In a stellarator fusion reactor having a fusion plasma in thermal balance disposed therein and external magnetic field coils and helical stabilizing coils said fusion plasma including alpha-particles and occupying a volume $V_0$ and said external toroidal magnetic field coils producing as toroidal confining magnetic field, a method of generating electricity in said external toroidal magnetic field coils from the energy of said alpha particles, said method comprising the steps of:

(a) compressing said plasma adiabatically to a volume $V_1$;

(b) expanding said compressed plasma, at constant pressure, to a volume $V_2$ at which $\beta=\beta_c$, said volume $V_2$ being greater than $V_1$ and less than $V_0$, such that temperature of said plasma is driven up by thermonuclear alpha-particle heating thereby providing a heated plasma; and (c) expanding said heated plasma from said volume $V_2$ to said volume $V_0$, said $\beta$ remaining at a value equal to $\beta_c$;

whereby electrical energy is simultaneously generated in said external toroidal magnetic field coils by a back-voltage produced by said expanding plasma.

7. The method of claim 6 wherein the step of compressing said plasma is performed by increasing the toroidal confining magnetic field produced by said toroidal magnetic field coils.

8. The method of claim 7 wherein the step of expanding said compressed plasma at constant pressure is performed by reducing the toroidal confining magnetic field produced by said toroidal magnetic field coils at a rate sufficient to maintain said plasma at a constant pressure.

9. In a stellarator fusion reactor system having a first and a second stellarator reactor, each of said first and second stellarator reactors having a fusion plasma disposed therein and external toroidal magnetic field coils and stabilizing helical coils, said fusion plasma including alpha-particles and occupying a volume $V_0$ and said toroidal magnetic field coils producing a toroidal confining magnetic field, a method of generating electricity in said external toroidal magnetic field coils from the energy of said alpha-particles, said method comprising:

(a) compressing the plasma in said first reactor adiabatically to a volume $V_1$;

(b) maintaining the volume of said compressed plasma in said first reactor at said volume $V_1$ for a time substantially equal to a thermal relaxation time, such that the temperature of said plasma is driven up by thermonuclear alpha-particle heating thereby providing a heated plasma;

(c) expanding said heated plasma in said first reactor to said volume $V_0$ and simultaneously generating electrical energy in said external toroidal magnetic field coils of said first reactor by a back-voltage produced by said expanding plasma;

(d) transferring a portion of said generated electrical energy to said second stellarator reactor in an amount sufficient to compress the plasma in said second reactor to a volume $V_1$;

(e) compressing the plasma in said second reactor adiabatically to a volume $V_1$;

(f) maintaining the volume of said plasma in said second reactor at said volume $V_1$, for a time substantially equal to a thermal relaxation time, such that the temperature of said plasma is driven up by thermonuclear alpha-particle heating thereby providing a heated plasma, while maintaining the volume of said plasma in said first reactor at said volume $V_0$; and (g) expanding said heated plasma in said second reactor to said volume $V_0$ and simultaneously generating electrical energy in said external toroidal magnetic field coils of said second reactor by a back-voltage produced by said expanding plasma.

10. The method of claim 9 further including the steps of:

transferring a portion of the electrical energy generated in said second reactor external toroidal magnetic field coils to said first reactor in an amount sufficient to compress the plasma in said first reaction to a volume $V_1$.

11. The method of claim 10 wherein said method is repeated cyclically.

12. The method of claim 11 wherein steps (a) and (e) are performed by increasing the toroidal confining magnetic field produced by said first and said second reactor toroidal magnetic field coils.

13. The method of claim 12 wherein steps (b) and (f) are performed by further increasing the toroidal confining magnetic field produced by said first and said second reactor toroidal magnetic field coils.

14. The method of claim 13 wherein steps (c) and (g) are performed by reducing the toroidal confining magnetic field produced by said first and said second reactor toroidal magnetic field coils.

15. A magnetic confinement fusion reactor for generating electricity comprising:

(a) toroidal vacuum vessel having a fusion plasma disposed therein, said plasma including alpha-particles;

(b) helical magnetic stabilizing coils disposed about said vacuum vessel;

(c) external toroidal magnetic confining field coils disposed about said vacuum vessel;

(d) means for generating a current through said toroidal coils;

(e) means for compressing said plasma;

(f) means for maintaining the volume of said compressed plasma constant, said means operable to maintain said compressed volume for a time substantially equal to a thermal relaxation time;

(g) means for expanding said plasma; and (h) means for transmitting current from said toroidal coils generated by said plasma.

16. The reactor of claim 15 wherein said means for compressing said plasma comprises means for increasing the current through said toroidal coils.

17. The reactor of claim 16 wherein said means for maintaining the volume of said compressed plasma comprises means for further increasing the current through said toroidal coils.

18. The reactor of claim 17 wherein the means for expanding said plasma comprising means for reducing the current through said toroidal coils.

19. An electric current generating system comprising:

(a) a first toroidal vacuum vessel, said vacuum vessel having a fusion plasma disposed therein, said fusion plasma including alpha-particles;

(b) A first set of helical magnetic stabilizing coils disposed about said first toroidal vacuum vessel;

(c) a first set of external toroidal magnetic coils disposed about said first toroidal vacuum vessel, said first set of toroidal coils operable to generate a magnetic field, to confine and compress said plasma, when an electric current is passed therethrough;

(d) means for generating a current through said first set of toroidal coils;

(e) means for transmitting electrical current, generated by said plasma, from said first set of toroidal coils;

(f) a second toroidal vacuum vessel, said vacuum vessel having a fusion plasma disposed therein, said fusion plasma including alpha-particles;

(g) a second set of helical magnetic stabilizing coils disposed about said second toroidal vacuum vessel;

(h) a second set of external toroidal magnetic coils disposed about said second toroidal vacuum vessel, said second set of toroidal coils operable to generate a magnetic field, to confine and compress said plasma, when an electric current is passed therethrough;

(i) means for transmitting electric current, generated by said plasma, from said second set of toroidal coils;

(j) means for transferring electrical current from said first set of toroidal coils to said second set of toroidal coils.

(k) means for transferring electric current from said second set of toroidals coils to said first set of toroidal coils.

* * * * *